United States Patent
Cura et al.

(10) Patent No.: US 12,410,346 B2
(45) Date of Patent: Sep. 9, 2025

(54) PROCESS OF MANUFACTURING A CURABLE PRECURSOR OF A STRUCTURAL ADHESIVE COMPOSITION

(71) Applicant: 3M INNOVATIVE PROPERTIES COMPANY, St. Paul, MN (US)

(72) Inventors: Elisabeth Cura, Düsseldorf (DE); Boris Tasch, Düsseldorf (DE); Adrian Jung, Kaarst (DE)

(73) Assignee: 3M Innovative Properties Company, St. Paul, MN (US)

( * ) Notice: Subject to any disclaimer, the term of this patent is extended or adjusted under 35 U.S.C. 154(b) by 596 days.

(21) Appl. No.: 17/441,319

(22) PCT Filed: Mar. 26, 2020

(86) PCT No.: PCT/IB2020/052886
§ 371 (c)(1),
(2) Date: Sep. 21, 2021

(87) PCT Pub. No.: WO2020/201944
PCT Pub. Date: Oct. 8, 2020

(65) Prior Publication Data
US 2022/0177749 A1    Jun. 9, 2022

(30) Foreign Application Priority Data
Apr. 2, 2019 (EP) .................................. 19166871

(51) Int. Cl.
*C08G 59/68* (2006.01)
*C09J 163/00* (2006.01)

(52) U.S. Cl.
CPC .......... *C09J 163/00* (2013.01); *C08G 59/686* (2013.01)

(58) Field of Classification Search
CPC ...... C09J 163/00; C09J 171/02; C09J 179/02; C09J 4/00; C08G 59/686; C08G 59/68
USPC ....................................................... 524/802
See application file for complete search history.

(56) References Cited

U.S. PATENT DOCUMENTS

| | | |
|---|---|---|
| 3,453,242 A | 7/1969 | Schmitt |
| 5,194,307 A | 3/1993 | Gardeski |
| 6,000,118 A | 12/1999 | Biernat |
| 6,368,008 B1 | 4/2002 | Biernat |
| 6,528,176 B1 | 3/2003 | Asai |
| 2002/0182955 A1 | 12/2002 | Weglewski |
| 2003/0153726 A1 | 8/2003 | Eckhardt |
| 2004/0014907 A1 | 1/2004 | Nowak |
| 2005/0101684 A1* | 5/2005 | You .......................... C08J 3/243 522/1 |
| 2011/0313082 A1 | 12/2011 | Popp |
| 2012/0156487 A1 | 6/2012 | Schoenfeld |
| 2016/0083629 A1* | 3/2016 | Wang ..................... C09J 133/08 522/74 |
| 2021/0340406 A1* | 11/2021 | Jung ...................... C08G 65/20 |

FOREIGN PATENT DOCUMENTS

| | | |
|---|---|---|
| DE | 197 53 456 B4 | 1/2007 |
| EP | 2700683 | 2/2014 |
| EP | 3243885 | 11/2017 |
| EP | 3 275 913 A1 | 1/2018 |
| EP | 3275913 | 1/2018 |
| EP | 3 632 964 B1 | 9/2022 |
| JP | 2000-44923 A2 | 2/2000 |
| JP | 2001-81111 A2 | 3/2001 |
| JP | 2008-13721 A2 | 1/2008 |
| JP | 2012-190846 A2 | 10/2012 |
| JP | 2021-165385 A2 | 10/2021 |
| WO | WO 03/052016 A2 | 6/2003 |
| WO | WO 2003-052016 | 6/2003 |
| WO | WO 03/076485 A2 | 9/2003 |
| WO | WO 2005/045525 A1 | 5/2005 |
| WO | WO 2007-014039 | 2/2007 |
| WO | WO 2007/016295 A1 | 2/2007 |
| WO | WO 2008/153076 A1 | 12/2008 |
| WO | WO 2009-071269 | 6/2009 |
| WO | WO 2010/099281 A1 | 9/2010 |
| WO | WO 2011/055784 A1 | 5/2011 |
| WO | WO 2011/063070 A1 | 5/2011 |
| WO | WO 2013/067947 A1 | 5/2013 |
| WO | WO 2016/047387 A1 | 3/2016 |
| WO | WO 2016/077131 A1 | 5/2016 |
| WO | WO 2017-197087 | 11/2017 |
| WO | WO 2018/022555 A1 | 2/2018 |
| WO | WO 2018/134721 A1 | 7/2018 |
| WO | WO 2019/065268 A1 | 4/2019 |
| WO | WO 2020-070687 | 4/2020 |
| WO | WO 2020/201982 A1 | 10/2020 |
| WO | WO 2020/201983 A1 | 10/2020 |

OTHER PUBLICATIONS

Dermer, "Ethylenimine and other Aziridines", Academic Press, 1969, pp. 1-5.
International Search Report for PCT International Application No. PCT/IB2020/052886, mailed on Jun. 8, 2020, 4 pages.

* cited by examiner

*Primary Examiner* — Jiangtian Xu
(74) *Attorney, Agent, or Firm* — Carlos M. Téllez Rodríguez; 3M Innovative Properties Company

(57) ABSTRACT

The present disclosure relates to a process of manufacturing curable precursor of a structural adhesive composition. According to another aspect, the present disclosure is directed to method of bonding two parts.

14 Claims, No Drawings

PROCESS OF MANUFACTURING A CURABLE PRECURSOR OF A STRUCTURAL ADHESIVE COMPOSITION

CROSS REFERENCE TO RELATED APPLICATIONS

This application is a national stage filing under 35 U.S.C. 371 of PCT/IB2019/052886, filed Mar. 26, 2020, which claims the benefit of European Application No. 191668714, filed Apr. 2, 2019, the disclosures of which are incorporated by reference in their entireties herein.

TECHNICAL FIELD

The present disclosure relates generally to the field of adhesives, more specifically to the field of structural adhesive compositions and films for use in particular for bonding metal or composite material parts. More specifically, the present disclosure relates to a process of manufacturing a curable precursor of a structural adhesive composition. The present disclosure also relates to a method of bonding two parts.

BACKGROUND

Adhesives have been used for a variety of holding, sealing, protecting, marking and masking purposes. One type of adhesive which is particularly preferred for many applications is represented by structural adhesives. Structural adhesives are typically thermosetting resin compositions that may be used to replace or augment conventional joining techniques such as screws, bolts, nails, staples, rivets and metal fusion processes (e.g. welding, brazing and soldering). Structural adhesives are used in a variety of applications that include general-use industrial applications, as well as high-performance applications in the automotive and aerospace industries. To be suitable as structural adhesives, the adhesives shall exhibit high and durable mechanical strength as well as high impact resistance.

Structural adhesives may, in particular, be used for metal joints in vehicles. For example, an adhesive may be used to bond a metal panel, for example a roof panel to the support structure or chassis of the vehicle. Further, an adhesive may be used in joining two metal panels of a vehicle closure panel. Vehicle closure panels typically comprise an assembly of an outer and an inner metal panel whereby a hem structure is formed by folding an edge of an outer panel over an edge of the inner panel. Typically, an adhesive is provided there between to bond the panels together. Further, a sealant typically needs to be applied at the joint of the metal panels to provide for sufficient corrosion resistance. For example, U.S. Pat. No. 6,000,118 (Biernat et al.) discloses the use of a flowable sealant bead between the facing surfaces of the two panels, and a thin film of uncured paint-like resin between a flange on the outer panel and the exposed surface of the inner panel. The paint film is cured to a solid impervious condition by a baking operation performed on the completed door panel. U.S. Pat. No. 6,368,008 (Biernat et al.) discloses the use of an adhesive for securing two metal panels together. The edge of the joint is further sealed by a metal coating. WO 2009/071269 (Morral et al.) discloses an expandable epoxy paste adhesive as a sealant for a hem flange. A further hemmed structure is disclosed in U.S. Pat. No. 6,528,176 (Asai et al.). Further efforts have been undertaken to develop adhesive compositions whereby two metal panels, in particular an outer and an inner panel of a vehicle closure panel, could be joined with an adhesive without the need for a further material for sealing the joint. Thus, it became desirable to develop adhesive systems that provide adequate bonding while also sealing the joint and providing corrosion resistance. A partial solution has been described in e.g. WO 2007/014039 (Lamon), which discloses a thermally expandable and curable epoxy-based precursor of an expanded thermoset film toughened foamed film comprising a mixture of solid and liquid epoxy resins, and which is claimed to provide both favorable energy absorbing properties and gap filling properties upon curing. Other partial solutions have been described in EP-A1-2 700 683 (Elgimiabi et al.) and in WO 2017/197087 (Aizawa) which disclose structural adhesive films suitable for forming a hem flange structure. Structural adhesive films or tapes typically suffer from lack of elasticity and insufficient tackiness which makes them only partially suitable for hem flange bonding. Further partial solutions have been described in US-A1-2002/0182955 (Weglewski et al.) which discloses a so-called structural bonding tape. Structural bonding tapes are generally insufficient in terms of adhesive strength and corrosion resistance.

In some specific bonding applications, structural adhesives may be required to adhesively bond assemblies provided with challenging configurations or critical topologies. This is particularly the case in those situations where the parts to be bonded are provided with an uneven or irregular gap. A partial solution has been described in EP-A1-3 243 885 (Koch et al.) which discloses a structural adhesive film provided with different thicknesses along its extension. The described films are typically not fully satisfactory for providing acceptable bonding performance in assemblies provided with more complex three-dimensional configurations or topologies, or with relatively wide gaps.

Without contesting the technical advantages associated with the solutions known in the art, there is still a need for a structural adhesive composition which would overcome the above-mentioned deficiencies.

SUMMARY

According to one aspect, the present disclosure relates to a process of manufacturing a curable precursor of a structural adhesive composition, comprising the steps of:
a) providing a mixing apparatus comprising a reaction chamber and an extrusion die;
b) providing a curable precursor of a structural adhesive composition, comprising:
  i. a cationically self-polymerizable monomer;
  ii. a polymerization initiator of the cationically self-polymerizable monomer which is initiated at a temperature T1;
  iii. a curable monomer which is different from the cationically self-polymerizable monomer; and
  iv. a curing initiator of the curable monomer which is initiated at a temperature T2 and which is different from the polymerization initiator of the cationically self-polymerizable monomer;
c) incorporating and mixing the curable precursor of the structural adhesive composition in the reaction chamber of the mixing apparatus, thereby forming an extrudable composition;
d) pressing the extrudable composition of step c) through the extrusion die, thereby forming an extrudate of the curable precursor of the structural adhesive composition;
e) optionally, cooling down the extrudate of step d); and f) allowing the self-polymerization reaction of the cationically self-polymerizable monomers in the extrudate; and wherein the polymerization initiator of the cationically self-polymerizable monomer or the cationically self-polymerizable monomer is incorporated and mixed in the curable precursor of the structural adhesive composition immediately prior to the step of pressing the extrudable composition of step c) through the extrusion die.

According to another aspect, the present disclosure is directed to a method of manufacturing a composite article comprising the step of applying an extrudate as described above on at least part of the surface of the article.

In still another aspect of the present disclosure, it is provided a method of bonding two parts, which comprises the steps of:
  a) applying an extrudate as described above to a surface of at least one of the two parts;
  b) joining the two parts so that the extrudate is positioned between the two parts; and
  c) substantially fully curing the extrudate by initiating the curing initiator of the cationically curable monomer, thereby obtaining a substantially fully cured structural adhesive composition and bonding the two parts.

According to yet another aspect, the present disclosure relates to the use of an extrudate as described above, for industrial applications, in particular for construction and transportation applications, more in particular for body-in-white bonding applications for the automotive industry and for structural bonding operations for the aeronautic and aerospace industries

DETAILED DESCRIPTION

According to a first aspect, the present disclosure relates to a process of manufacturing a curable precursor of a (hybrid) structural adhesive composition, comprising the steps of:
  a) providing a mixing apparatus comprising a reaction chamber and an extrusion die;
  b) providing a curable precursor of a structural adhesive composition, comprising:
    i. a cationically self-polymerizable monomer;
    ii. a polymerization initiator of the cationically self-polymerizable monomer which is initiated at a temperature T1;
    iii. a curable monomer which is different from the cationically self-polymerizable monomer; and
    iv. a curing initiator of the curable monomer which is initiated at a temperature T2 and which is different from the polymerization initiator of the cationically self-polymerizable monomer;
  c) incorporating and mixing the curable precursor of the structural adhesive composition in the reaction chamber of the mixing apparatus, thereby forming an extrudable composition;
  d) pressing the extrudable composition of step c) through the extrusion die, thereby forming an extrudate of the curable precursor of the structural adhesive composition;
  e) optionally, cooling down the extrudate of step d); and
  f) allowing the self-polymerization reaction of the cationically self-polymerizable monomers in the extrudate; and wherein the polymerization initiator of the cationically self-polymerizable monomer or the cationically self-polymerizable monomer is incorporated and mixed in the curable precursor of the structural adhesive composition immediately prior to the step of pressing the extrudable composition of step c) through the extrusion die.

In the context of the present disclosure, it has been surprisingly found that a process as described above is particularly suitable for manufacturing a curable precursor of a structural adhesive composition which will ultimately be provided with excellent characteristics and performance as to elasticity, tackiness, cold-flow, flexibility, handling properties and surface wetting in their uncured (or pre-cured) state, as well as to adhesive strength, ageing stability and corrosion resistance in their fully cured state. The curable precursor of a structural adhesive composition as described above have been surprisingly found to combine most of the advantageous characteristics of both the structural adhesive films and the structural bonding tapes known in the art, without exhibiting their known deficiencies.

It has further been discovered that a curable precursor as described above may be appropriately shaped in the form of a three-dimensional object, in particular a complex three-dimensional object, which makes it advantageously suitable to provide excellent bonding performance in assemblies provided with complex three-dimensional configurations or topologies. It has additionally been found that a process as described above enables forming curable precursors shaped in the form of elongated films having a relatively high thickness (typically greater than 500 micrometres) and which makes them particularly suitable for bonding applications involving the adhesive connection of assemblies provided with relatively wide gaps.

In some executions, the curable precursor as described above is suitable for manufacturing structural adhesive compositions provided with excellent characteristics and performance as to adhesion to oily contaminated substrates, such as stainless steel and aluminum.

Without wishing to be bound by theory, it is believed that these excellent characteristics are due to the combination of the above-described composition and the various process steps and sequence as described above, and in particular to the process step of incorporating and mixing the polymerization initiator of the cationically self-polymerizable monomer or the cationically self-polymerizable monomer in the curable precursor of the structural adhesive composition immediately prior to the step of pressing the extrudable composition of step c) through the extrusion die. This specific sequence of steps is believed to provide the advantageous shapeability characteristics of the curable precursor. The curable precursor according to the present disclosure may be advantageously applied in a geometrically controlled way directly on a particular substrate. From a composition point of view, the presence of a specific dual curing system in the curable precursor, wherein the curing system comprises: a) a polymerization initiator of a cationically self-polymerizable monomer which is initiated at a temperature T1, and b) a curing initiator of a curable monomer which is initiated at a temperature T2 and which is different from the polymerization initiator of the cationically self-polymerizable monomer it is believed to play a crucial role in the most of the advantageous properties detailed above.

Still without wishing to be bound by theory, it is believed that this dual/hybrid curing system involving two independent reactive systems, which have a different chemical nature and which co-exist in the curable precursor without interfering with each other, has the ability to form—upon complete curing—an interpenetrating network involving a polymeric material comprising the self-polymerization reaction product of a polymerizable material comprising the cationically self-polymerizable monomer and a polymeric product resulting from the curing of the curable monomer.

More specifically, the above described hybrid curing system is particularly suitable to perform an overall curing mechanism involving a two-stage reaction whereby two polymer networks are formed sequentially.

In a first stage reaction (stage-B), the cationically self-polymerizable monomers polymerize upon initiation by the polymerization initiator of the cationically self-polymerizable monomer at a temperature T1, thereby forming a polymeric material comprising the self-polymerization reaction product of a polymerizable material comprising the cationically self-polymerizable monomers. Typically, the temperature T1 at which the polymerization initiator of the cationically self-polymerizable monomer is initiated is insufficient to cause initiation of the curing initiator of the curable monomer. As a consequence, the first stage reaction typically results in a partially cured precursor, wherein the curable monomers are substantially uncured and are in particular embedded into the polymeric material comprising the self-polymerization reaction product of the polymerizable material comprising the cationically self-polymerizable monomers.

The first stage reaction which typically leads to a phase change of the initial curable precursor due in particular to the polymeric material comprising the self-polymerization reaction product of the cationically self-polymerizable monomers providing structural integrity to the initial curable precursor, is typically referred to as a film-forming reaction. Advantageously, the first stage reaction does typically not require any substantial energy input.

In the context of the present disclosure, it has been surprisingly found that the first stage reaction (stage-B) and the accompanying phase change does not, or only moderately affect, the three-dimensional shape of the initial curable precursor. As such, the partially cured precursor resulting for the first stage reaction is provided with excellent shape retention characteristics, when compared to the initial shape of the curable precursor. This is a particularly surprising and counterintuitive finding as the skilled person would have logically expected the three-dimensional polymeric network resulting from the self-polymerization reaction of the cationically self-polymerizable monomers (i.e. comprised in the partially cured precursor resulting from the first stage reaction) to substantially affect the three-dimensional shape of the initial curable precursor, due in particular to a modification of the viscosity, thixotropic and wettability characteristics of the initial curable precursor. According to the process of the present disclosure, the first stage reaction (stage-B) and the accompanying phase change does not, or only moderately do, occur before the extrudable composition of step c) is pressed through the extrusion die. As such, the first stage reaction is deliberately prevented, or substantially reduced, until the extrudable composition has exited the extrusion die and the mixing apparatus.

As such, the process of the present disclosure enables near net shape application of the structural adhesive, whereby the initial shape of the curable precursor is retained and fixed by the formation of the polymeric material resulting from the self-polymerization reaction of the cationically self-polymerizable monomers occurring during the first stage reaction. The near net shape application enabled by the process of the present disclosure considerably reduces, or even eliminates, the need for further reshaping, finishing, readjusting, and remodelling of the initially applied precursor after partial curing.

In a typical aspect, the partially cured precursor takes the form of a film-like self-supporting composition having a dimensional stability, which makes it possible for it to be pre-applied on a selected substrate, in particular a liner, until further processing. The partially cured precursor is typically provided with excellent characteristics and performance as to elasticity, tackiness, cold-flow and surface wetting. Advantageously, the partially cured precursor may be appropriately shaped to fulfil the requirements of any specific applications.

The second stage reaction (stage-A) occurs after the first stage reaction and typically involves curing the curable monomers upon initiation (typically thermal initiation) by the appropriate curing initiators at a temperature T2. This reaction step typically results in forming a polymeric product resulting from the curing of the curable monomer, in particular from the (co)polymerization of the curable monomers and the curing initiators (or curatives) of the curable monomers.

The curable precursor of the present disclosure typically relies on the above-described dual/hybrid curing system involving two independent reactive systems activated at distinct temperatures (T1 and T2) to ensure performing the above-described two-stage reaction in a sequential manner. Advantageously, the curable precursor of the present disclosure may be partially cured (or pre-cured) and pre-applied on a selected substrate before being finally cured in-place to produce a structural adhesive provided with excellent characteristics directly on the desired substrate or article.

As such, the curable precursor of the present disclosure is outstandingly suitable for bonding metal parts, in particular for hem flange bonding of metal parts in the automotive industry. Advantageously still, the curable precursor is suitable for automated handling and application, in particular by fast robotic equipment.

In the context of the present disclosure, the expression "cationically self-polymerizable monomer" is meant to refer to a monomer able to form a polymeric product (homopolymer) resulting from the polymerization of the monomer almost exclusively with itself and involving the formation of a cationic intermediate moiety, thereby forming a homopolymer. The term "homopolymer" is herein meant to designate polymer(s) resulting from the polymerization of a single type of monomers.

In the context of the present disclosure still, the expression "curable monomer" is mean to refer to a monomer able to form a polymeric product (heteropolymer) resulting from the (co)polymerization of the curable monomers and the curing initiators (or curatives) of the curable monomers. The term "heteropolymer" is herewith meant to designate a polymer resulting from the (co)polymerization of more than one type of monomers.

In the context of the present disclosure, the expression "the curable monomers are substantially uncured" is meant to designate that less than 10 wt. %, less than 5 wt. %, less than 2 wt. %, or even less than 1 wt. % of the initial curable monomers are cured.

The terms "glass transition temperature" and "Tg" are used interchangeably and refer to the glass transition temperature of a (co)polymeric material or a mixture of monomers and polymers. Unless otherwise indicated, glass transition temperature values are determined by Differential Scanning calorimetry (DSC).

According to one typical aspect of the process of the disclosure, the temperature T2 for use herein is greater than temperature T1. In a typical aspect, the temperature T1 at which the polymerization initiator of the cationically self-polymerizable monomer is initiated is insufficient to cause initiation of the curing initiator of the curable monomer which therefore remain substantially unreacted.

According to another typical aspect of the process, the step of incorporating and mixing the curable precursor of the structural adhesive composition in the reaction chamber of the mixing apparatus is performed at a temperature greater than temperature T1 and typically no greater than temperature T2.

According to an advantageous aspect of the disclosure, the cationically self-polymerizable monomers remain substantially unpolymerized before the extrudable composition of step c) is pressed through the extrusion die.

In the context of the present disclosure, the expression "the cationically self-polymerizable monomers remain substantially unpolymerized" is meant to designate that less than 10 wt. %, less than 5 wt. %, less than 2 wt. %, or even less than 1 wt. % of the initial curable monomers are self-polymerized.

In an exemplary aspect of the process, no greater than 20 wt. %, no greater than 15 wt. %, no greater than 10 wt. %, no greater than 5 wt. %, or even no greater than 1 wt. % of the cationically self-polymerizable monomers, based on the overall weight of the cationically self-polymerizable monomers, are self-polymerized before the extrudable composition of step c) is pressed through the extrusion die.

In another exemplary aspect of the process, at least 0.1 wt. %, at least 0.5 wt. %, at least 1 wt. %, at least 2 wt. %, or even at least 5 wt. % of the cationically self-polymerizable monomers, based on the overall weight of the cationically self-polymerizable monomers, are self-polymerized before the extrudable composition of step c) is pressed through the extrusion die.

According to another typical aspect of the curable precursor of the disclosure, the cationically self-polymerizable monomer and the curable monomer for use herein are unable to chemically react with each other, in particular by covalent bonding, even when subjected to their respective polymerization or curing initiation. In an exemplary aspect, the cationically self-polymerizable monomer and the curable monomer are unable to chemically react with each other, when subjected to polymerization or curing initiation at a temperature of 23° C.

In one exemplary aspect of the present disclosure, the temperature T1 for use herein is no greater than 90° C., no greater than 80° C., no greater than 60° C., no greater than 50° C., no greater than 40° C., no greater than 30° C., no greater than 25° C., no greater than 20° C., or even no greater than 15° C. In some exemplary aspects of the disclosure, the polymerization initiator of the cationically self-polymerizable monomer is already initiated at room temperature (about 23° C.).

In another exemplary aspect of the present disclosure, the temperature T1 is in a range from −10° C. to 85° C., from 0° C. to 80° C., from 5° C. to 60° C., from 5° C. to 50° C., from 10 to 40° C., or even from 15 to 35° C.

In still another exemplary aspect of the present disclosure, the temperature T2 for use herein is greater than 90° C., greater than 100° C., greater than 120° C., greater than 140° C., greater than 150° C., greater than 160° C., greater than 180° C., or even greater than 200° C.

According to another typical aspect of the curable precursor, the temperature T2 is in a range from 95° C. to 250° C., from 100° C. to 220° C., from 120° C. to 200° C., from 140° C. to 200° C., from 140° C. to 180° C., or even from 160° C. to 180° C.

In some exemplary aspects of the disclosure, the curing initiator of the curable monomer for use herein which is initiated at a temperature T2 may be qualified as a thermally-initiated curing initiator or thermal initiator which is activated at substantially high temperatures.

Mixing apparatus for use herein are not particularly limited. Any mixing apparatus commonly known known in the art of structural adhesives may be used in the context of the present disclosure provided they comprise a reaction chamber and an extrusion die. Suitable mixing apparatus for use herein may be easily identified by those skilled in the art in the light of the present disclosure.

According to one advantageous aspect, the mixing apparatus for use in the process according to the disclosure is selected from the group of single- and multi-screw extruders. More advantageously, the mixing apparatus for use herein is selected from the group consisting of single screw extruders, twin screw extruders, planetary roller extruders, and ring extruders.

Typical examples of mixing apparatus which may advantageously be used herein, include but are not limited to, co-rotating multi-screw extruders and counter-rotating multi-screw extruders.

Cationically self-polymerizable monomers for use herein are not particularly limited. Suitable cationically self-polymerizable monomers for use herein may be easily identified by those skilled in the art in the light of the present disclosure.

According to one advantageous aspect of the curable precursor of the disclosure, the cationically self-polymerizable monomer for use herein is able to polymerize by cationic ring-opening polymerization. Accordingly, and in a beneficial aspect, the cationically self-polymerizable monomer for use in the present disclosure comprises at least two heterocyclic groups, in particular cyclic amine groups.

According to another advantageous aspect of the disclosure, the cationically self-polymerizable monomer for use herein is further crosslinkable, in particular able to participate in crosslinking reactions of the polymer product resulting from the polymerization of the cationically self-polymerizable monomers.

In a beneficial aspect of the disclosure, the cationically self-polymerizable monomer for use herein is an oligomer having, in particular a number average molecular weight no greater than 20.000 g/mol, no greater than 15.000 g/mol, no greater than 12.000 g/mol, no greater than 10.000 g/mol, or even no greater than 8.000 g/mol. Unless otherwise indicated, the number average molecular weight as used in the context of the present disclosure is determined by GPC using appropriate techniques well known to those skilled in the art. Preferably, the number average molecular weight as used herein is determined by GPC according to ISO 13385-1 (2008).

According to a beneficial aspect of the disclosure, the cationically self-polymerizable monomer for use herein is a polyfunctional compound comprising at least one cyclic amine, preferably two cyclic amines. In an exemplary aspect, the cyclic amine which may be comprised in the cationically self-polymerizable monomer for use herein is selected from the group consisting of aziridines, azetidines, pyrrolidines, piperidines, and any combinations or mixtures thereof.

In one advantageous aspect, the cationically self-polymerizable monomer for use herein is a polyfunctional compound comprising at least two aziridine functional groups. More advantageously, the cationically self-polymerizable monomer for use herein is a polyfunctional aziridine, in particular a bis-aziridino compound.

In a more advantageous aspect of the disclosure, the cationically self-polymerizable monomer is an aziridino-functional oligomer. Advantageously, the cationically self-polymerizable monomer is an aziridino-functional polar oligomer.

In an exemplary aspect, the aziridino-functional oligomer for use herein has a number average molecular weight, preferably determined by GPC according to ISO 13385-1 (2008), of no greater than 20.000 g/mol, no greater than 15.000 g/mol, no greater than 12.000 g/mol, no greater than 10.000 g/mol, or even no greater than 8.000 g/mol.

According to another advantageous aspect of the disclosure, the cationically self-polymerizable monomer for use herein is an aziridino-functional compound based on an oligomeric backbone, in particular a linear oligomer backbone, more in particular a linear polar oligomer backbone.

In an exemplary aspect, the oligomeric backbone for use in the aziridino-functional compound comprises moieties selected from the group consisting of polyether, polyester, polyurethane, polythioether, polysulfide, silicone, polyalkylene, polystyrene, and any combinations of mixtures thereof. In a more advantageous aspect, the oligomeric backbone for use in the aziridino-functional compound comprises moieties selected from the group consisting of polyether, polyester, polythioether, and any combinations of mixtures thereof.

According to an advantageous aspect, the cationically self-polymerizable monomer is an aziridino-functional (linear) polyether oligomer, in particular an N-alkyl aziridino-functional (linear) polyether oligomer.

Suitable polyether oligomers may be produced in a manner known to those skilled in the art by the reaction of the starting compound having a reactive hydrogen atom with alkylene oxides, for example ethylene oxide, propylene oxide, butylene oxide, styrene oxide, tetrahydrofuran or epichlorohydrine or mixtures of two or more thereof. Especially suitable polyether oligomers for use herein are obtainable by polyaddition of ethylene oxide, 1,2-propylene oxide, 1,2-butylene oxide or tetrahydrofuran or of mixtures of two or more of the mentioned compounds with the aid of a suitable starting compound and a suitable catalyst.

In a particularly beneficial aspect, suitable polyether oligomers for use herein are polyetherdiols obtainable by cationic copolymerization of ethylene oxide and tetrahydrofuran under catalytic action of boron trifluoride etherate. Suitable cationically self-polymerizable monomers for use herein and possible production methods thereof are described e.g. in U.S. Pat. No. 3,453,242 (Schmitt et al.).

According to one preferred execution of the present disclosure, the cationically self-polymerizable monomer for use herein has the following formula:

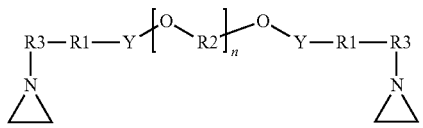

wherein:
$R^1$ is a covalent bond or an alkylene group;
each $R^2$ is independently selected from the group consisting of alkylene groups;
$R^3$ is a straight chain or branched alkylene groups;
Y is a divalent linking group;

and n is an integer selected such that the calculated number average molecular weight of the polyether oligomer is in particular greater than 2000 g/mol.

According to another preferred execution of the present disclosure, the cationically self-polymerizable monomer for use herein has the following formula:

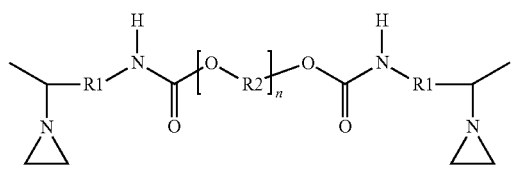

wherein:
$R^1$ is an alkylene group;
each $R^2$ is independently selected from the group consisting of alkylene groups having 2 to 6 carbon atoms; and
n is an integer selected such that the calculated number average molecular weight of the polyether oligomer is in particular between 2000 and 10.000 g/mol.

According to still another preferred execution of the present disclosure, the cationically self-polymerizable monomer for use herein has the following formula:

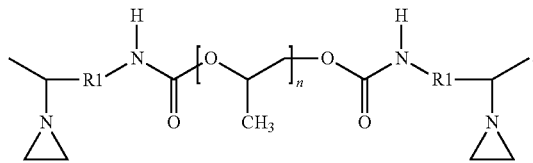

In an advantageous aspect, radical $R^1$ is an alkylene group having two carbon atoms. In another advantageous aspect, radical $R^2$ is independently selected from the group consisting of linear alkylene groups having 2 to 6 carbon atoms.

According to still another advantageous aspect of the present disclosure, the cationically self-polymerizable monomer for use herein has the following formula:

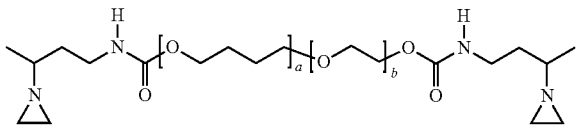

wherein a and b are integers greater than or equal to 1, and the sum of a and b is equal to n.

According to an exemplary aspect of the disclosure, n is selected such that the calculated number average molecular weight of the cationically self-polymerizable monomer is no greater than 10.000 grams/mole.

Curable monomers for use herein are not particularly limited, as long as they are different from the cationically self-polymerizable monomers. Any curable monomers commonly known in the art of structural adhesives may be used in the context of the present disclosure. Suitable curable monomers for use herein may be easily identified by those skilled in the art in the light of the present disclosure.

According to one particular aspect of the disclosure, the curable monomer for use herein is a cationically curable monomer, which is in particular curable by cationic ring-opening curing.

According to an advantageous aspect of the present disclosure, the curable monomer for use herein comprises at least one functional group selected from the group consisting of epoxy groups, in particular glycidyl groups.

According to another advantageous aspect, the curable monomer for use herein is an epoxy resin. Exemplary epoxy resins for use herein may be advantageously selected from the group consisting of phenolic epoxy resins, bisphenol epoxy resins, hydrogenated epoxy resins, aliphatic epoxy resins, halogenated bisphenol epoxy resins, novolac epoxy resins, and any mixtures thereof.

Epoxy resins are well known to those skilled in the art of structural adhesive compositions. Suitable epoxy resins for use herein and their methods of manufacturing are amply described e.g. in EP-A1-2 700 683 (Elgimiabi et al.) and in WO 2017/197087 (Aizawa).

In a particularly advantageous aspect of the disclosure, the curable monomer for use herein is an epoxy resin selected from the group consisting of novolac epoxy resins, bisphenol epoxy resins, in particular those derived from the reaction of bisphenol-A with epichlorhydrin (DGEBA resins), and any mixtures thereof.

Polymerization initiators of the cationically self-polymerizable monomer for use herein are not particularly limited. Any polymerization initiators of cationically self-polymerizable monomers commonly known in the art of structural adhesives may be used in the context of the present disclosure. Suitable polymerization initiators of the cationically self-polymerizable monomer for use herein may be easily identified by those skilled in the art in the light of the present disclosure.

Exemplary polymerization initiators of the cationically self-polymerizable monomer for use herein are amply described in O.C. DERMER, G. E. HAM "Ethylenimine and other Aziridines", Academic Press (1969), and in particular in US-A1-2003/0153726 (Eckhardt et al.).

According to one exemplary aspect of the disclosure, the polymerization initiator of the cationically self-polymerizable monomer for use herein is selected from the group consisting of protonating agents, alkylating agents, and any combinations or mixtures thereof.

In one advantageous aspect of the disclosure, the polymerization initiator of the cationically self-polymerizable monomer is selected from the group consisting of alkylating agents, in particular from the group consisting of arylsulphonic acid esters, sulfonium salts, in particular alkyl sulfonium salts, and any combinations or mixtures thereof.

More advantageously, the polymerization initiator of the cationically self-polymerizable monomer for use herein is selected from the group of arylsulphonic acid esters, in particular from the group consisting of p-toluene sulphonic acid esters, and preferably methyl-p-toluene sulfonate.

In an alternatively advantageous aspect of the disclosure, the polymerization initiator of the cationically self-polymerizable monomer is selected from the group consisting of protonating agents, in particular from the group consisting of Lewis acids, Broensted acids or precursor of Broensted acids, and any combinations or mixtures thereof.

In another advantageous aspect, the polymerization initiator of the cationically self-polymerizable monomer for use in the present disclosure is selected from the group consisting of Broensted acids, in particular from the group consisting of sulfonic acids, sulfonium acids, phosphonic acids, phosphoric acids, carboxylic acids, antimonic acids, boric acids, and any combinations, mixtures or salts thereof.

In still another advantageous aspect, the polymerization initiator of the cationically self-polymerizable monomer for use in the present disclosure is selected from the group consisting of Broensted acids, in combination with antacid-acting components, in particular selected from the group consisting of oxides, hydroxides, carbonates and carboxylates of the elements aluminium, chromium, copper, germanium, manganese, lead, antimony, tin, tellurium, titanium and zinc. The antacid-acting component may beneficially be selected to comprise zinc, and wherein the polymerization initiator of the cationically self-polymerizable monomer is in particular selected to be zinc tosylate.

Curing initiators of the curable monomer for use herein are not particularly limited, as long as they are different from the polymerization initiators of the cationically self-polymerizable monomers. Any curing initiators of curable monomers commonly known in the art of structural adhesives may be used in the context of the present disclosure. Suitable curing initiators for use herein may be easily identified by those skilled in the art in the light of the present disclosure.

According to one typical aspect of the disclosure, the curing initiator for use herein is selected from the group consisting of rapid-reacting curing initiators, latent curing initiators, and any combinations or mixtures thereof. More typically, the curing initiator for use herein is selected from the group consisting of rapid-reacting thermally-initiated curing initiators, latent thermally-initiated curing initiators, and any combinations or mixtures thereof.

According to an advantageous aspect of the present disclosure, the curing initiator of the curable monomer is selected from the group consisting of primary amines, secondary amines, and any combinations or mixtures thereof.

According to another advantageous aspect, the amines for use as curing initiator of the curable monomer are selected from the group consisting of aliphatic amines, cycloaliphatic amines, aromatic amines, aromatic structures having one or more amino moiety, polyamines, polyamine adducts, dicyandiamides, and any combinations or mixtures thereof.

According to still another advantageous aspect of the disclosure, the curing initiator of the curable monomer for use herein is selected from the group consisting of dicyandiamide, polyamines, polyamine adducts, and any combinations or mixtures thereof.

In a preferred aspect, the curing initiator of the curable monomer is selected to be dicyandiamide.

In an advantageous execution, the curable precursor of the present disclosure further comprises a curing accelerator of the curable monomer, which is in particular selected from the group consisting of polyamines, polyamine adducts, ureas, substituted urea adducts, imidazoles, imidazole salts, imidazolines, aromatic tertiary amines, and any combinations or mixtures thereof.

Curing initiators and curing accelerators are well known to those skilled in the art of structural adhesive compositions. Suitable curing initiators and curing accelerators for use herein and their methods of manufacturing are amply described e.g. in EP-A1-2 700 683 (Elgimiabi et al.) and in WO 2017/197087 (Aizawa).

In one preferred execution, the curing accelerator of the curable monomer is selected from the group of polyamine adducts, substituted ureas, in particular N-substituted urea adducts.

In a particularly preferred execution of the disclosure, the curing accelerator of the curable monomer is selected from the group of substituted urea adducts, in particular N-substituted urea adducts. In the context of the present disclosure, it has been indeed surprisingly discovered that the use of a curing accelerator of the curable monomer selected from the group of substituted urea adducts, in particular N-substituted urea adducts, substantially improve the adhesion properties, in particular the peel adhesion properties of the resulting structural adhesive composition.

According to a typical aspect of the present disclosure, the curable precursor further comprises a second curable monomer which is also different from the cationically self-polymerizable monomer.

In an advantageous aspect, the second curable monomer for use in the present disclosure comprises at least one functional group selected from the group consisting of epoxy groups, in particular glycidyl groups. Advantageously still, the second curable monomer for use herein is an epoxy resin, in particular selected from the group consisting of phenolic epoxy resins, bisphenol epoxy resins, hydrogenated epoxy resins, aliphatic epoxy resins, halogenated bisphenol epoxy resins, novolac epoxy resins, and any mixtures thereof.

In a particularly preferred execution of the disclosure, the second curable monomer for use herein is an epoxy resin selected from the group consisting of hydrogenated bisphenol epoxy resins, in particular those derived from the reaction of hydrogenated bisphenol-A with epichlorhydrin (hydrogenated DGEBA resins), and any mixtures thereof. In the context of the present disclosure, it has been indeed surprisingly discovered that the use of a second curable monomer selected in particular from the group of hydrogenated bisphenol epoxy resins, substantially maintains or even improve the adhesion properties, in particular the peel adhesion properties of the resulting structural adhesive composition towards oily contaminated substrates. These specific curable precursors are particularly suitable to result into structural adhesive compositions having outstanding excellent oil-contamination tolerance towards, in particular oily contaminated metal substrates.

Exemplary oily contamination is for example mineral oils, and synthetic oils. Typical mineral oils include paraffinic mineral oils, intermediate mineral oils and naphthenic mineral oils.

In an advantageous aspect, the adhering step(s) of the surfaces to be bonded may be performed without using a pre-cleaning step of the substrates, parts and, and/or without using an adhesion promoter, in particular a priming composition or a tie layer.

According to another advantageous aspect, the curable precursor according to the disclosure further comprises a thermoplastic resin. Thermoplastic resins for use herein are not particularly limited. Any thermoplastic resins commonly known in the art of structural adhesives may be used in the context of the present disclosure. Suitable thermoplastic resins for use herein may be easily identified by those skilled in the art in the light of the present disclosure.

Thermoplastic resins are known to those skilled in the art of structural adhesive compositions. Suitable exemplary thermoplastic resins for use herein are described e.g. in EP-A1-2 700 683 (Elgimiabi et al.).

According to one advantageous aspect of the disclosure, the thermoplastic resins for use herein have a glass transition temperature (Tg) in a range from 60° C. and 140° C., when measured by Differential Scanning calorimetry (DSC).

In a more advantageous aspect, the thermoplastic resins for use herein have a softening point comprised between 70° C. and 120° C., preferably between 80° C. and 100° C., more preferably between 85° C. and 95° C.

According to another advantageous aspect of the disclosure, the thermoplastic resin for use herein is selected from the group consisting of polyether thermoplastic resins, polypropylene thermoplastic resins, polyvinyl chloride thermoplastic resins, polyester thermoplastic resins, polycaprolactone thermoplastic resins, polystyrene thermoplastic resins, polycarbonate thermoplastic resins, polyamide thermoplastic resins, polyurethane thermoplastic resins, and any combinations of mixtures thereof.

According to still another advantageous aspect of the disclosure, the thermoplastic resin for use herein is selected from the group of polyether thermoplastic resins, and in particular polyhydroxyether thermoplastic resins.

In a more advantageous aspect, the polyhydroxyether thermoplastic resins for use herein are selected from the group consisting of phenoxy resins, polyether diamine resins, polyvinylacetal resins, in particular polyvinyl butyral resins, and any combinations or mixtures thereof.

According to a particularly preferred execution of the disclosure, the thermoplastic resin for use herein is selected from the group of phenoxy resins.

In the context of the present disclosure, it has been indeed surprisingly discovered that the use of a thermoplastic resin, in particular a thermoplastic resin selected from the group of phenoxy resins, substantially improve the adhesion properties, in particular the peel adhesion properties, as well as the toughening characteristics of the resulting structural adhesive composition. This is particularly surprising and counterintuitive as thermoplastic resins are generally recognized and used as film-forming additives.

According to an advantageous aspect of the disclosure, the curable precursor for use herein is substantially free of acrylic-based monomers or acrylic resins. By "substantially free of acrylic-based monomers or acrylic resins", it is herewith meant to express that the curable precursor comprises less than 10 wt. %, less than 5 wt. %, less than 2 wt. %, less than 1 wt. %, or even less than 0.5 wt. % of acrylic-based monomers or acrylic resins.

According to another advantageous aspect, the curable precursor of the disclosure is substantially free of free radical-polymerizable monomers or compounds, in particular irradiation-initiated free radical initiators. By "substantially free of free radical-polymerizable monomers or compounds", it is herewith meant to express that the curable precursor comprises less than 10 wt. %, less than 5 wt. %, less than 2 wt. %, less than 1 wt. %, or even less than 0.5 wt. % of free radical-polymerizable monomers or compounds.

In one exemplary aspect, the curable precursor according to the present disclosure comprises:
  a) from 0.1 to 20 wt. %, from 0.5 to 15 wt. %, from 0.5 to 10 wt. %, or even from 1 to 5 wt. % of a cationically self-polymerizable monomer;
  b) from 10 to 80 wt. %, from 20 to 70 wt. %, or even from 20 to 60 wt. %, of a curable monomer;
  c) from 0.01 to 10 wt. %, from 0.02 to 8 wt. %, from 0.05 to 5 wt. %, from 0.1 to 3 wt. %, or even from 0.2 to 2 wt. %, of a polymerization initiator of the cationically self-polymerizable monomer;
  d) from 0.1 to 20 wt. %, from 0.2 to 15 wt. %, from 0.2 to 10 wt. %, from 0.5 to 8 wt. %, or even from 1 to 6 wt. %, of a curing initiator of the curable monomer;
  e) from 0 to 60 wt. %, from 1 to 50 wt. %, from 1 to 40 wt. %, from 2 to 30 wt. %, from 5 to 30 wt. %, from 5 to 20 wt. %, or even from 8 to 15 wt. %, of a second curable monomer;
  f) from 0 to 20 wt. %, from 0.2 to 15 wt. %, from 0.2 to 10 wt. %, from 0.5 to 8 wt. %, or even from 1 to 5 wt. %, of a thermoplastic resin; and g) from 0 to 20 wt. %, from 0.05 to 15 wt. %, from 0.1 to 10 wt. %, from 0.5 to 8 wt. %, or even from 0.5 to 5 wt. %, of a curing accelerator of the curable monomer; and h) optionally, a toughening agent.

According to an advantageous aspect of the disclosure, the curable precursor comprises a cationically self-polymerizable monomer and a curable monomer in a weight ratio ranging from 0.5:99.5 to 50:50, from 1:99 to 40:60, from 1:99 to 30:70, from 2:98 to 30:70, from 2:98 to 20:80, from 2:98 to 15:85, from 2:98 to 10:90, from 3:97 to 8:92, or even from 3:97 to 6:94.

According to one typical aspect, the curable precursor of the present disclosure is in the form of a one-part structural adhesive composition.

According to another aspect of the process according to the present disclosure, the extrudate of step d) comprises:
 a) a polymeric material comprising the self-polymerization reaction product of a polymerizable material comprising a cationically self-polymerizable monomer;
 b) optionally, some residual polymerization initiator of the cationically self-polymerizable monomer which is initiated at a temperature T1;
 c) a curable monomer which is different from the cationically self-polymerizable monomer;
 d) a curing initiator of the curable monomer which is initiated at a temperature T2 and which is different from the polymerization initiator of the cationically self-polymerizable monomer; and
wherein the curable monomers are substantially uncured.

In a typical aspect of the extrudate (also referred to as a partially cured precursor), the curable monomers are substantially uncured and are, in particular, embedded into the polymeric material comprising the self-polymerization reaction product of a polymerizable material comprising a cationically self-polymerizable monomer. In a typical aspect, the curable monomers are still liquid monomers embedded into the polymeric material resulting from the self-polymerization of the cationically self-polymerizable monomers, wherein this polymeric material represents a fully-established three-dimensional network.

The extrudate is typically a stable and self-supporting composition having a dimensional stability, which makes it possible for it to be pre-applied on a selected substrate, in particular a liner, until further processing. In particular, the pre-applied substrate may be suitably transferred to other production sites until final full curing is performed. Advantageously still, the extrudate may be appropriately shaped to fulfil the specific requirements of any selected applications. The extrudate is typically provided with excellent characteristics and performance as to elasticity, tackiness, cold-flow and surface wetting.

According to a typical aspect of the extrudate according to the disclosure, the polymeric material comprising the self-polymerization reaction product of the polymerizable material comprising the cationically self-polymerizable monomer is substantially fully polymerized and has in particular a degree of polymerization of more than 90%, more than 95%, more than 98%, or even more than 99%. As the polymeric material comprising the self-polymerization reaction product of the cationically self-polymerizable monomer is substantially fully polymerized, this polymerization reaction has advantageously a fixed and irreversible end and will not trigger any shelf-life reducing reactions in the remaining of the curable precursor. This characteristic will beneficially impact the overall shelf-life of the curable precursor.

According to a particularly advantageous aspect of the extrudate, the polymeric material comprises or consists of a polyetherimine, in particular a linear or branched polyethylenimine (PEI). The polyetherimine typically results from the self-polymerization of bis-aziridino compounds, in particular N-alkyl aziridino-functional polyether oligomers, acting as cationically self-polymerizable monomers.

In one typical aspect of the disclosure, the extrudate has a shear storage modulus in a range from 1000 to 250.000 Pa, from 1000 to 200.000 Pa, from 2000 to 150.000 Pa, from 3000 to 150.000 Pa, from 3000 to 100.000 Pa, or even from 3000 to 80.000 Pa, when measured according to the test method described in the experimental section.

According to an exemplary aspect, the extrudate according to the disclosure has a shear storage modulus deviation no greater than 30%, no greater than 25%, no greater than 20%, no greater than 15%, no greater than 10%, or even no greater than 5%, when compared to the shear storage modulus of the corresponding curable precursor prior to partial curing, when the shear storage modulus deviation is measured according to the test method described in the experimental section.

According to another exemplary aspect, the extrudate according to the disclosure has a shape retention factor greater than 70%, greater than 75%, greater than 80%, greater than 85%, greater than 90%, or even greater than 95%, when compared to the shape of the corresponding curable precursor prior to partial curing, when the shape retention factor is measured according to the test method described in the experimental section.

In one advantageous aspect, the extrudate for use herein has a glass transition temperature (Tg) no greater than 0° C., no greater than −5° C., no greater than −10° C., no greater than −15° C., or even no greater than −20° C., when measured by DSC.

In another advantageous aspect of the disclosure, the extrudate for use herein has an elongation at break of at least 50%, at least 80%, at least 100%, at least 150%, or even at least 200%, when measured according to tensile test DIN EN ISO 527. This particular property makes the extrudate and the resulting structural adhesive suitable for automated handling and application, in particular by high-speed robotic equipment. More particularly, the extrudate and the resulting structural adhesive of the present disclosure enables efficient automation of the process of forming a metal or composite material joint between metal or composite material plates.

According to a typical aspect, the process according to the disclosure further comprises the step of substantially fully curing the extrudate of the curable precursor, in particular at a temperature T2 or greater, thereby forming a structural adhesive composition.

In another typical aspect, the structural adhesive composition comprises an interpenetrating network involving the polymeric material comprising the self-polymerization reaction product of the polymerizable material comprising the cationically self-polymerizable monomer and the polymeric product resulting from the curing of the curable monomer.

According to another aspect, the process of the present disclosure further comprises the step of shaping the extrudate of step c) in the form of a three-dimensional object.

In a typical aspect of the process, the step of shaping the extrudate is performed simultaneously with the step of pressing the extrudable composition through the extrusion die.

According to one advantageous aspect, the three-dimensional object for use herein is shaped in the form of an elongated film. The elongated film shape is one conventional and convenient shape for the structural adhesive to be pre-applied on a selected substrate, in particular a liner, until further processing. However, this specific shape is not always satisfactory for adhesively bond assemblies provided with complex three-dimensional configurations or topologies, in particular provided with challenging bonding areas.

Accordingly, the extrudate of the disclosure may—in another aspect—be shaped in the form of a three-dimensional object. Suitable three-dimensional object shapes for use herein will broadly vary depending on the targeted bonding application and the specific configuration of the assembly to bond, in particular the bonding area. Exemplary three-dimensional object shapes for use herein will be easily identified by those skilled in the art in the light of the present disclosure.

According to one exemplary aspect of the present disclosure, the three-dimensional object has a shape selected from the group consisting of circular, semi-circular, ellipsoidal, square, rectangular, triangular, trapezoidal, polygonal shape, or any combinations thereof.

In the context of the present disclosure, the shape of the three-dimensional object is herein meant to refer to the shape of the section of the three-dimensional object according to a direction substantially perpendicular to the greatest dimension of the three-dimensional object.

In another advantageous aspect, the three-dimensional object for use herein is shaped in the form of an elongated film having a thickness greater than 500 micrometres, greater than 600 micrometres, greater than 700 micrometres, greater than 800 micrometres, greater than 900 micrometres, or even greater than 1000 micrometres.

According to still another aspect, the present disclosure relates to a method of manufacturing a composite article comprising the step of applying an extrudate as described above on at least part of the surface of the article.

Suitable surfaces and articles for use herein are not particularly limited. Any surfaces, articles, substrates and material commonly known to be suitable for use in combination with structural adhesive compositions may be used in the context of the present disclosure.

In a typical aspect, the article for use herein comprises at least one part, in particular a metal or a composite material part.

In an advantageous aspect, the composite article for use herein is used for body-in-white bonding applications for the automotive industry, in particular for hem flange bonding of parts, more in particular metal or composite material parts; and for structural bonding operations for the aeronautic and aerospace industries.

In yet another aspect of the present disclosure, it is a provided a method of bonding two parts comprising the step of using an extrudate as described above.

According to a particular aspect of the disclosure, the method of bonding two parts comprises the steps of:
  a) applying an extrudate as described above to a surface of at least one of the two parts;
  b) joining the two parts so that the extrudate is positioned between the two parts; and
  c) substantially fully curing the extrudate by initiating the curing initiator of the cationically curable monomer, thereby obtaining a substantially fully cured structural adhesive composition and bonding the two parts.

According to an advantageous aspect of the method of bonding two parts, the two parts are metal or composite material parts.

According to another advantageous aspect, the method of bonding two parts is for hem flange bonding of metal or composite material parts, wherein:
  the extrudate is shaped in the form of an elongated film;
  the extrudate film has a first portion near a first end of said extrudate film and a second portion near the second end opposite to the first end of said extrudate film;
  the first metal or composite material part comprises a first metal or composite material panel having a first body portion and a first flange portion along a margin of said first body portion adjacent a first end of said first body portion;
  the second metal or composite material part comprises a second metal or composite material panel having a second body portion and a second flange portion along a margin of said second body portion adjacent a second end of said second body portion;
  wherein the method comprises the steps of:
  a) adhering the extrudate film to said first metal or composite material panel or second metal or composite material panel, whereby following adhering and folding, a metal or composite material joint is obtained wherein the extrudate film is folded such that:
    i. the first portion of the extrudate film is provided between the second flange of the second metal or composite material panel and the first body portion of the first metal or composite material panel, and
    ii. the second portion of the extrudate film is provided between the first flange of the first metal or composite material panel and the second body portion of the second metal or composite material panel; and
  b) substantially fully curing the extrudate by initiating the curing initiator of the cationically curable monomer, thereby obtaining a substantially fully cured structural adhesive composition and bonding the metal or composite material joint.

According to still another advantageous aspect of the method of bonding two parts, a side of a first edge portion of the first metal or composite material part is folded back and a hem flange structure is formed so as to sandwich the second metal or composite material part, and the extrudate as described above is disposed so as to adhere at least the first edge portion of the first metal or composite material part and a first surface side of the second metal or composite material part to each other.

Methods of bonding two parts, in particular for hem flange bonding of metal parts, are well known to those skilled in the art of structural adhesive compositions. Suitable methods of bonding two parts for use herein are amply described e.g. in EP-A1-2 700 683 (Elgimiabi et al.) and in WO 2017/197087 (Aizawa).

In a particular aspect of the present disclosure, the substrates, parts and surfaces for use in these methods comprise a metal selected from the group consisting of aluminum, steel, iron, and any mixtures, combinations or alloys thereof. More advantageously, the substrates, parts and surfaces for use herein comprise a metal selected from the group consisting of aluminum, steel, stainless steel and any mixtures, combinations or alloys thereof. In a particularly advantageous execution of the present disclosure, the substrates, parts and surfaces for use herein comprise aluminum.

In a particular aspect of the present disclosure, the substrates, parts and surfaces for use in these methods comprise a composite material.

Any composite material commonly known in the art may be used in the context of the present disclosure. Suitable composite material for use herein may be easily identified by those skilled in the art in the light of the present disclosure.

In one particular aspect, the composite material for use herein is selected from the group consisting of epoxy-based materials, phenolic-based materials, polyamide-based materials, polyethylene-based materials, polypropylene-based materials, polybutylene terephthalate-based materials, and any combinations or mixtures thereof.

In another aspect, the composite material for use herein comprises a resin matrix and reinforcing fibers. Exemplary resin matrices for use herein comprise a base material advantageously selected from the group consisting epoxy-based materials, phenolic-based materials, polyamide-based materials, polyethylene-based materials, polypropylene-based materials, polybutylene terephthalate-based materials, and any combinations or mixtures thereof. In another particular aspect, the reinforcing fibers are selected from the group consisting of carbon fibers, glass fibers, ceramic fibers, and any combinations or mixtures thereof.

According to still another aspect, the present disclosure relates to the use of an extrudate as described above, for industrial applications, in particular for construction and automotive applications, in particular for body-in-white bonding applications for the automotive industry and for structural bonding operations for the aeronautic and aerospace industries.

According to yet another aspect, the present disclosure relates to the use of an extrudate as described above, for bonding metal or composite material parts, in particular for hem flange bonding of metal or composite material parts in the automotive industry.

In yet another aspect, the present disclosure relates to the use of an extrudate as described above, for forming a curable precursor or a fully cured structural adhesive composition shaped in the form of a three-dimensional object, in particular a three-dimensional object as described above.

Item 1 is a (continuous) process of manufacturing a curable precursor of a (hybrid) structural adhesive composition, comprising the steps of:
  a) providing a mixing apparatus comprising a reaction chamber and an extrusion die;
  b) providing a curable precursor of a (hybrid) structural adhesive composition, comprising:
    i. a cationically self-polymerizable monomer;
    ii. a polymerization initiator of the cationically self-polymerizable monomer which is initiated at a temperature T1;
    iii. a curable monomer which is different from the cationically self-polymerizable monomer; and
    iv. a curing initiator of the curable monomer which is initiated at a temperature T2 and which is different from the polymerization initiator of the cationically self-polymerizable monomer;
  c) incorporating and mixing the curable precursor of the (hybrid) structural adhesive composition in the reaction chamber of the mixing apparatus (at a temperature greater than temperature T1 and no greater than temperature T2), thereby forming an extrudable composition;
  d) pressing the extrudable composition of step c) through the extrusion die, thereby forming an extrudate of the curable precursor of the (hybrid) structural adhesive composition;
  e) optionally, cooling down the extrudate of step d); and
  f) allowing the self-polymerization reaction of the cationically self-polymerizable monomers in the extrudate; and wherein the polymerization initiator of the cationically self-polymerizable monomer or the cationically self-polymerizable monomer is incorporated and mixed in the curable precursor of the (hybrid) structural adhesive composition immediately prior to the step of pressing the extrudable composition of step c) through the extrusion die.

Item 2 is a process according to item 1, wherein the temperature T2 is greater than T1, and wherein the temperature T1 at which the polymerization initiator of the cationically self-polymerizable monomer is initiated is insufficient to cause initiation of the curing initiator of the curable monomer.

Item 3 is a process according to any of item 1 or 2, wherein the step of incorporating and mixing the curable precursor of the (hybrid) structural adhesive composition in the reaction chamber of the mixing apparatus is performed at a temperature greater than temperature T1 and typically no greater than temperature T2.

Item 4 is a process according to any of the preceding items, wherein the cationically self-polymerizable monomers remain substantially unpolymerized before the extrudable composition of step c) is pressed through the extrusion die.

Item 5 is a process according to item 4, wherein no greater than 20 wt. %, no greater than 15 wt. %, no greater than 10 wt. %, no greater than 5 wt. %, or even no greater than 1 wt. % of the cationically self-polymerizable monomers, based on the overall weight of the cationically self-polymerizable monomers, are self-polymerized before the extrudable composition of step c) is pressed through the extrusion die.

Item 6 is a process according to any of the preceding items, wherein at least 0.1 wt. %, at least 0.5 wt. %, at least 1 wt. %, at least 2 wt. %, or even at least 5 wt. % of the cationically self-polymerizable monomers, based on the overall weight of the cationically self-polymerizable monomers, are self-polymerized before the extrudable composition of step c) is pressed through the extrusion die.

Item 7 is a process precursor according to any of the preceding items, wherein the cationically self-polymerizable monomer and the curable monomer are unable to chemically react with each other, in particular by covalent bonding, even when subjected to polymerization or curing initiation.

Item 8 is a process according to any of the preceding items, wherein the cationically self-polymerizable monomer and the curable monomer are unable to chemically react with each other, when subjected to polymerization or curing initiation at a temperature of 23° C.

Item 9 is a process according to any of the preceding items, wherein the temperature T1 is no greater than 90° C., no greater than 80° C., no greater than 60° C., no greater than 50° C., no greater than 40° C., no greater than 30° C., no greater than 25° C., no greater than 20° C., or even no greater than 15° C.

Item 10 is a process according to any of the preceding items, wherein the temperature T1 is in a range from −10° C. to 85° C., from 0° C. to 80° C., from 5° C. to 60° C., from 5° C. to 50° C., from 10 to 40° C., or even from 15 to 35° C.

Item 11 is a process according to any of the preceding items, wherein the temperature T2 is greater than 90° C., greater than 100° C., greater than 120° C., greater than 140° C., greater than 150° C., greater than 160° C., greater than 180° C., or even greater than 200° C.

Item 12 is a process according to any of the preceding items, wherein the temperature T2 is in a range from 95° C.

to 250° C., from 100° C. to 220° C., from 120° C. to 200° C., from 140° C. to 200° C., from 140° C. to 180° C., or even from 160° C. to 180° C.

Item 13 is a process according to any of the preceding items, wherein the cationically self-polymerizable monomer is further crosslinkable.

Item 14 is a process according to any of the preceding items, wherein the cationically self-polymerizable monomer polymerizes by cationic ring-opening polymerization.

Item 15 is a process according to any of the preceding items, wherein the cationically self-polymerizable monomer is an oligomer having, in particular a number average molecular weight, preferably determined by GPC according to ISO 13385-1 (2008), of no greater than 20.000 g/mol, no greater than 15.000 g/mol, no greater than 12.000 g/mol, no greater than 10.000 g/mol, or even no greater than 8.000 g/mol.

Item 16 is process according to any of the preceding items, wherein the cationically self-polymerizable monomer is a polyfunctional compound comprising at least one cyclic amine, preferably two cyclic amines.

Item 17 is a process according to item 16, wherein the cyclic amine is selected from the group consisting of aziridines, azetidines, pyrrolidines, piperidines, and any combinations or mixtures thereof.

Item 18 is a process according to any of the preceding items, wherein the cationically self-polymerizable monomer is a polyfunctional compound comprising at least two aziridine functional groups.

Item 19 is a process according to any of the preceding items, wherein the cationically self-polymerizable monomer is a polyfunctional aziridine, in particular a bis-aziridino compound.

Item 20 is a process according to any of the preceding items, wherein the cationically self-polymerizable monomer is an aziridino-functional oligomer, in particular an aziridino-functional polar oligomer.

Item 21 is a process according to any of the preceding items, wherein the cationically self-polymerizable monomer is an aziridino-functional compound based on an oligomer backbone, in particular a polar oligomer backbone, comprising in particular a (linear) polyether, a (linear) polyester or a (linear) polythioether.

Item 22 is a process according to any of the preceding items, wherein the cationically self-polymerizable monomer is an aziridino-functional (linear) polyether oligomer, in particular an N-alkyl aziridino-functional (linear) polyether oligomer.

Item 23 is a process according to item 22, wherein the (linear) polyether oligomer backbone is obtained by copolymerization of tetrahydrofuran units, ethylene oxide units, and optionally propylene oxide units.

Item 24 is a process according to any of the preceding items, wherein the cationically self-polymerizable monomer has the following formula:

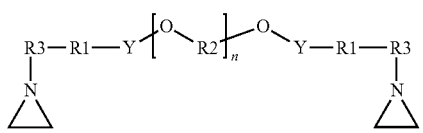

wherein:
R$^1$ is a covalent bond or an alkylene group;
each R$^2$ is independently selected from the group consisting of alkylene groups;
R$^3$ is a straight chain or branched alkylene groups;
Y is a divalent linking group;
and n is an integer selected such that the calculated number average molecular weight of the polyether oligomer is in particular greater than 2000 g/mol.

Item 25 is a process according to any of the preceding items, wherein the cationically self-polymerizable monomer has the following formula:

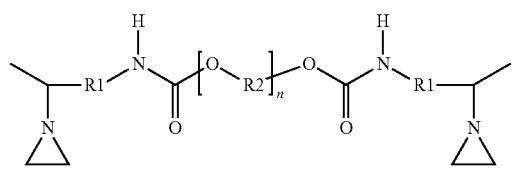

wherein:
R$^1$ is an alkylene group;
each R$^2$ is independently selected from the group consisting of alkylene groups having 2 to 6 carbon atoms; and
n is an integer selected such that the calculated number average molecular weight of the polyether oligomer is in particular between 2000 and 10.000 g/mol.

Item 26 is a process according to any of item 24 or 25, wherein the cationically self-polymerizable monomer has the following formula:

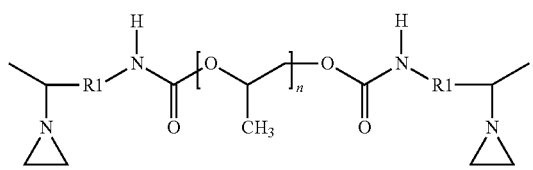

Item 27 is a process according to any of items 23 to 26, wherein R$^1$ is an alkylene group having two carbon atoms.

Item 28 is a process according to any of item 24 or 25, wherein R$^2$ is independently selected from the group consisting of linear alkylene groups having 2 to 6 carbon atoms.

Item 29 is a process according to item 24, wherein the cationically self-polymerizable monomer has the following formula:

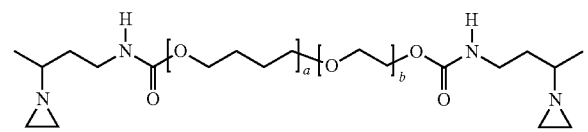

wherein a and b are integers greater than or equal to 1, and the sum of a and b is equal to n.

Item 30 is a process according to any of items 24 to 26, wherein n is selected such that the calculated number average molecular weight of the cationically self-polymerizable monomer is no greater than 10.000 grams/mole.

Item 31 is a process according to any of the preceding items, wherein the curable monomer which is different from the cationically self-polymerizable monomer is a cationically curable monomer, which is in particular curable by cationic ring-opening curing.

Item 32 is a process according to any of the preceding items, wherein the curable monomer which is different from the cationically self-polymerizable monomer comprises at least one functional group selected from the group consisting of epoxy groups, in particular glycidyl groups.

Item 33 is a process according to any of the preceding items, wherein the curable monomer is an epoxy resin, in particular selected from the group consisting of phenolic epoxy resins, bisphenol epoxy resins, hydrogenated epoxy resins, aliphatic epoxy resins, halogenated bisphenol epoxy resins, novolac epoxy resins, and any mixtures thereof.

Item 34 is a process according to any of the preceding items, wherein the curable monomer is an epoxy resin selected from the group consisting of novalac epoxy resins, bisphenol epoxy resins, in particular those derived from the reaction of bisphenol-A with epichlorhydrin (DGEBA resins), and any mixtures thereof.

Item 35 is a process according to any of the preceding items, wherein the polymerization initiator of the cationically self-polymerizable monomer is selected from the group consisting of protonating agents, alkylating agents, and any combinations or mixtures thereof.

Item 36 is a process according to any of the preceding items, wherein the polymerization initiator of the cationically self-polymerizable monomer is selected from the group consisting of alkylating agents, in particular from the group consisting of arylsulphonic acid esters, sulfonium salts, in particular alkyl sulfonium salts, and any combinations or mixtures thereof.

Item 37 is a process according to any of item 35 or 36, wherein the polymerization initiator of the cationically self-polymerizable monomer is selected from the group of arylsulphonic acid esters, in particular from the group consisting of p-toluene sulphonic acid esters, and preferably methyl-p-toluene sulfonate.

Item 38 is a process according to any of items 1 to 35, wherein the polymerization initiator of the cationically self-polymerizable monomer is selected from the group consisting of protonating agents, in particular from the group consisting of Lewis acids, Broensted acids or precursor of Broensted acids, and any combinations or mixtures thereof.

Item 39 is a process according to any of items 1 to 35, wherein the polymerization initiator of the cationically self-polymerizable monomer is selected from the group consisting of Broensted acids, in particular from the group consisting of sulfonic acids, sulfonium acids, phosphonic acids, phosphoric acids, carboxylic acids, antimonic acids, boric acids, and any combinations, mixtures or salts thereof.

Item 40 is a process according to any of items 1 to 35 or 38, wherein polymerization initiator of the cationically self-polymerizable monomer is selected from the group consisting of Broensted acids, in combination with antacid-acting components, in particular selected from the group consisting of oxides, hydroxides, carbonates and carboxylates of the elements aluminium, chromium, copper, germanium, manganese, lead, antimony, tin, tellurium, titanium and zinc.

Item 41 is a process according to item 40, wherein the antacid-acting component is selected to comprise zinc, and wherein the polymerization initiator of the cationically self-polymerizable monomer is in particular selected to be zinc tosylate.

Item 42 is a process according to any of the preceding items, wherein the curing initiator of the curable monomer is selected from the group consisting of rapid-reacting (thermally-initiated) curing initiators, latent (thermally-initiated) curing initiators, and any combinations or mixtures thereof.

Item 43 is a process according to any of the preceding items, wherein the curing initiator of the curable monomer is selected from the group consisting of primary amines, secondary amines, and any combinations or mixtures thereof.

Item 44 is a process according to item 43, wherein the amines are selected from the group consisting of aliphatic amines, cycloaliphatic amines, aromatic amines, aromatic structures having one or more amino moiety, polyamines, polyamine adducts, dicyandiamides, and any combinations or mixtures thereof.

Item 45 is a process according to any of the preceding items, wherein the curing initiator of the curable monomer is selected from the group consisting of dicyandiamide, polyamines, polyamine adducts, and any combinations or mixtures thereof.

Item 46 is a process according to any of the preceding items, wherein the curing initiator of the curable monomer is selected to be dicyandiamide.

Item 47 is a process according to any of the preceding items, wherein the curable precursor of the (hybrid) structural adhesive composition further comprises a curing accelerator of the curable monomer, which is in particular selected from the group consisting of polyamines, polyamine adducts, ureas, substituted urea adducts, imidazoles, imidazole salts, imidazolines, aromatic tertiary amines, and any combinations or mixtures thereof.

Item 48 is a process according to item 47, wherein the curing accelerator of the curable monomer is selected from the group of polyamine adducts, substituted ureas, in particular N-substituted urea adducts.

Item 49 is a process according to any of the preceding items, wherein the curable precursor of the (hybrid) structural adhesive composition further comprises a second curable monomer which is different from the cationically self-polymerizable monomer.

Item 50 is a process according to item 49, wherein the second curable monomer comprises at least one functional group selected from the group consisting of epoxy groups, in particular glycidyl groups.

Item 51 is a process according to any of item 49 or 50, wherein the second curable monomer is an epoxy resin, in particular selected from the group consisting of phenolic epoxy resins, bisphenol epoxy resins, hydrogenated epoxy resins, aliphatic epoxy resins, halogenated bisphenol epoxy resins, novolac epoxy resins, and any mixtures thereof.

Item 52 is a process according to any of items 49 to 51, wherein the second curable monomer is an epoxy resin selected from the group consisting of hydrogenated bisphenol epoxy resins, in particular those derived from the reaction of hydrogenated bisphenol-A with epichlorhydrin (hydrogenated DGEBA resins), and any mixtures thereof.

Item 53 is a process according to any of the preceding items, which further comprises a thermoplastic resin having in particular a glass transition temperature (Tg) in a range from 60° C. to 140° C., from 70° C. to 120° C., from 80° C. to 100° C., or even from 85° C. to 95° C., when measured by Differential Scanning calorimetry (DSC).

Item 54 is a process according to item 53, wherein the thermoplastic resin is selected from the group consisting of polyether thermoplastic resins, polypropylene thermoplastic resins, polyvinyl chloride thermoplastic resins, polyester thermoplastic resins, polycaprolactone thermoplastic resins, polystyrene thermoplastic resins, polycarbonate thermoplastic resins, polyamide thermoplastic resins, polyurethane thermoplastic resins, and any combinations of mixtures thereof.

Item 55 is a process according to any of item 53 or 54, wherein the thermoplastic resin is selected from the group of polyether thermoplastic resins, and in particular polyhydroxyether thermoplastic resins.

Item 56 is a curable precursor according to item 55, wherein the polyhydroxyether thermoplastic resins are selected from the group consisting of phenoxy resins, polyether diamine resins, polyvinylacetal resins, in particular polyvinyl butyral resins, and any combinations or mixtures thereof.

Item 57 is a process according to any of items 53 to 56, wherein the thermoplastic resin is selected from the group of phenoxy resins.

Item 58 is a process according to any of the preceding items, wherein the curable precursor of the (hybrid) structural adhesive composition is substantially free of acrylic-based monomers or acrylic resins.

Item 59 is a process according to any of the preceding items, wherein the curable precursor of the (hybrid) structural adhesive composition is substantially free of free radical-polymerizable monomers or compounds, in particular irradiation-initiated free radical initiators.

Item 60 is a process according to any of the preceding items, wherein the curable precursor of the (hybrid) structural adhesive composition comprises:
  a) from 0.1 to 20 wt. %, from 0.5 to 15 wt. %, from 0.5 to 10 wt. %, or even from 1 to 5 wt. % of a cationically self-polymerizable monomer;
  b) from 10 to 80 wt. %, from 20 to 70 wt. %, or even from 20 to 60 wt. %, of a curable monomer;
  c) from 0.01 to 10 wt. %, from 0.02 to 8 wt. %, from 0.05 to 5 wt. %, from 0.1 to 3 wt. %, or even from 0.2 to 2 wt. %, of a polymerization initiator of the cationically self-polymerizable monomer;
  d) from 0.1 to 20 wt. %, from 0.2 to 15 wt. %, from 0.2 to 10 wt. %, from 0.5 to 8 wt. %, or even from 1 to 6 wt. %, of a curing initiator of the curable monomer;
  e) from 0 to 60 wt. %, from 1 to 50 wt. %, from 1 to 40 wt. %, from 2 to 30 wt. %, from 5 to 30 wt. %, from 5 to 20 wt. %, or even from 8 to 15 wt. %, of a second curable monomer;
  f) from 0 to 20 wt. %, from 0.2 to 15 wt. %, from 0.2 to 10 wt. %, from 0.5 to 8 wt. %, or even from 1 to 5 wt. %, of a thermoplastic resin;
  g) from 0 to 20 wt. %, from 0.05 to 15 wt. %, from 0.1 to 10 wt. %, from 0.5 to 8 wt. %, or even from 0.5 to 5 wt. %, of a curing accelerator of the curable monomer; and
  h) optionally, a toughening agent.

Item 61 is a process according to any of the preceding items, wherein the curable precursor of the (hybrid) structural adhesive composition comprises a cationically self-polymerizable monomer and a curable monomer in a weight ratio ranging from 0.5:99.5 to 50:50, from 1:99 to 40:60, from 1:99 to 30:70, from 2:98 to 30:70, from 2:98 to 20:80, from 2:98 to 15:85, from 2:98 to 10:90, from 3:97 to 8:92, or even from 3:97 to 6:94.

Item 62 is a process according to any of the preceding items, wherein the curable precursor of the (hybrid) structural adhesive composition is in the form of a one-part (hybrid) structural adhesive composition.

Item 63 is a process according to any of the preceding items, wherein the extrudate of step d) comprises:
  a) a polymeric material comprising the self-polymerization reaction product of a polymerizable material comprising a cationically self-polymerizable monomer;
  b) optionally, some residual polymerization initiator of the cationically self-polymerizable monomer which is initiated at a temperature T1;
  c) a curable monomer which is different from the cationically self-polymerizable monomer;
  d) a curing initiator of the curable monomer which is initiated at a temperature T2 and which is different from the polymerization initiator of the cationically self-polymerizable monomer; and
wherein the curable monomers are substantially uncured and are in particular embedded into the polymeric material comprising the self-polymerization reaction product of a polymerizable material comprising a cationically self-polymerizable monomer.

Item 64 is a process according to item 63, wherein the polymeric material comprising the self-polymerization reaction product of the polymerizable material comprising the cationically self-polymerizable monomer is substantially fully polymerized and has in particular a degree of polymerization of more than 90%, more than 95%, more than 98%, or even more than 99%.

Item 65 is a process according to any of item 63 or 64, wherein the polymeric material comprises or consists of a polyetherimine, in particular a linear or branched polyethylenimine (PEI).

Item 66 is a process according to any of items 63 to 65, wherein the extrudate has a shear storage modulus in a range from 1000 to 250.000 Pa, from 1000 to 200.000 Pa, from 2000 to 150.000 Pa, from 3000 to 150.000 Pa, from 3000 to 100.000 Pa, or even from 3000 to 80.000 Pa, when measured according to the test method described in the experimental section.

Item 67 is a process according to any of items 63 to 66, wherein the extrudate has a shear storage modulus deviation no greater than 30%, no greater than 25%, no greater than 20%, no greater than 15%, no greater than 10%, or even no greater than 5%, when compared to the shear storage modulus of the corresponding curable precursor prior to partial curing, when the shear storage modulus deviation is measured according to the test method described in the experimental section.

Item 68 is a process according to any of items 63 to 67, wherein the extrudate has a shape retention factor greater than 70%, greater than 75%, greater than 80%, greater than 85%, greater than 90%, or even greater than 95%, when compared to the shape of the corresponding curable precursor prior to partial curing, when the shape retention factor is measured according to the test method described in the experimental section.

Item 69 is a process according to any of items 63 to 68, wherein the extrudate has a glass transition temperature (Tg) no greater than 0° C., no greater than −5° C., no greater than −10° C., no greater than −15° C., or even no greater than −20° C., when measured by DSC.

Item 70 is a process according to any of items 63 to 69, wherein the extrudate has an elongation at break of at least 50%, at least 80%, at least 100%, at least 150%, or even at least 200%, when measured according to tensile test DIN EN ISO 527.

Item 71 is a process according to any of the preceding items, which further comprises the step of substantially fully curing the extrudate of the curable precursor, in particular at a temperature T2 or greater, thereby forming a (hybrid) structural adhesive composition.

Item 72 is a process according to item 71, wherein the (hybrid) structural adhesive composition comprises an interpenetrating network involving the polymeric material comprising the self-polymerization reaction product of the polymerizable material comprising the cationically self-polymerizable monomer and the polymeric product resulting from the curing of the curable monomer.

Item 73 is a process according to any of the preceding items, which further comprises the step of shaping the extrudate of step c) in the form of a three-dimensional object, and wherein the step of shaping the extrudate is in particular performed simultaneously with the step of pressing the extrudable composition through the extrusion die.

Item 74 is a process according to item 73, wherein the three-dimensional object has a shape selected from the group consisting of circular, semi-circular, ellipsoidal, square, rectangular, triangular, trapezoidal, polygonal shape, or any combinations thereof.

Item 75 is a process according to any of item 73 or 74, wherein the three-dimensional object is shaped in the form of an elongated film.

Item 76 is a process according to item 75, wherein the elongated film has a thickness greater than 500 micrometres, greater than 600 micrometres, greater than 700 micrometres, greater than 800 micrometres, greater than 900 micrometres, or even greater than 1000 micrometres.

Item 77 is a method of manufacturing a composite article comprising the step of applying an extrudate as described in any of the preceding items on at least part of the surface of the article.

Item 78 is a method according to item 77, wherein the article comprises at least one part, in particular a metal or a composite material part.

Item 79 is a method according to any of item 77 or 78, wherein the composite article is used for body-in-white bonding applications for the automotive industry, in particular for hem flange bonding of parts, more in particular metal or composite material parts; and for structural bonding operations for the aeronautic and aerospace industries.

Item 80 is a method of bonding two parts comprising the step of using an extrudate according to any of items 1 to 76.

Item 81 is a method of bonding two parts according to item 80, which comprises the steps of:
  a) applying an extrudate as described in any items 1 to 76 to a surface of at least one of the two parts;
  b) joining the two parts so that the extrudate is positioned between the two parts; and
  c) substantially fully curing the extrudate by initiating the curing initiator of the cationically curable monomer, thereby obtaining a substantially fully cured (hybrid) structural adhesive composition and bonding the two parts.

Item 82 is a method of bonding two parts according to any of item 80 or 81, wherein the two parts are metal or composite material parts, and wherein the method is for hem flange bonding of metal or composite material parts.

Item 83 is a method according to item 82, wherein:
  the extrudate is shaped in the form of an elongated film;
  the extrudate film has a first portion near a first end of said extrudate film and a second portion near the second end opposite to the first end of said extrudate film;
  the first metal or composite material part comprises a first metal or composite material panel having a first body portion and a first flange portion along a margin of said first body portion adjacent a first end of said first body portion;
  the second metal or composite material part comprises a second metal or composite material panel having a second body portion and a second flange portion along a margin of said second body portion adjacent a second end of said second body portion;
  wherein the method comprises the steps of:
    a) adhering the extrudate film to said first metal or composite material panel or second metal or composite material panel, whereby following adhering and folding, a metal or composite material joint is obtained wherein the extrudate film is folded such that:
      i. the first portion of the extrudate film is provided between the second flange of the second metal or composite material panel and the first body portion of the first metal or composite material panel, and
      ii. the second portion of the extrudate film is provided between the first flange of the first metal or composite material panel and the second body portion of the second metal or composite material panel; and
    b) substantially fully curing the extrudate by initiating the curing initiator of the cationically curable monomer, thereby obtaining a substantially fully cured (hybrid) structural adhesive composition and bonding the metal or composite material joint.

Item 84 is a method according to item 83, wherein a side of a first edge portion of the first metal or composite material part is folded back and a hem flange structure is formed so as to sandwich the second metal or composite material part, and the extrudate according to any of items 1 to 76 is disposed so as to adhere at least the first edge portion of the first metal or composite material part and a first surface side of the second metal or composite material part to each other.

Item 85 is the use of an extrudate according to any of items 1 to 76, for industrial applications, in particular for construction and transportation applications, more in particular for body-in-white bonding applications for the automotive industry and for structural bonding operations for the aeronautic and aerospace industries.

Item 86 is the use according to item 85 for bonding metal or composite material parts, in particular for hem flange bonding of metal or composite material parts in the automotive industry.

Item 87 is the use of an extrudate as described in any of items 1 to 76, for forming a curable precursor or a fully cured (hybrid) structural adhesive composition shaped in the form of a three-dimensional object as described in any of items 73 to 75.

EXAMPLES

The present disclosure is further illustrated by the following examples. These examples are merely for illustrative purposes only and are not meant to be limiting on the scope of the appended claims.

Test Methods:
Preparation of the Formulations for Testing:

The curable precursor compositions are prepared from an extruded mixture of two components (Part B and Part A). The preparation of both, part A and B, is described hereinafter. Parts A and Part B are weighed into a beaker in the appropriate mixing ratio and mixed at 3500 rpm for 0.5 minutes until a homogeneous mixture is achieved. As soon as this step is completed the mixing initiates the first reaction step (stage-B reaction step) resulting in a partially cured precursor within a period ranging from 30 to 60 minutes. Within the open time, the obtained paste is applied to the surface of the test panel for further testing in the manner specified below.

Preparation of the Test Samples for OLS and T-Peel Tests:

The surface of OLS and T-peel samples (steel, grade DX54+ZMB-RL1615) are cleaned with n-heptane and coated with 3 g/m$^2$ of the testing oil (Ferrocoat N6130 commercially available from Quaker Chemical Corporaton).

The test samples are left at ambient room temperature (23° C.+/−2° C., 50% relative humidity+1-5%) for 24 hours prior to testing and the OLS and T-peel strengths are measured as described above.

1) Overlap Shear Strength (OLS) according to DIN EN 1465.

Overlap shear strength is determined according to DIN EN 1465 using a Zwick Z050 tensile tester (commercially available by Zwick GmbH & Co. KG, Ulm, Germany) operating at a cross head speed of 10 mm/min. For the preparation of an Overlap Shear Strength test assembly, the curable precursor paste is spackled onto one surface of a test panel and removed with a squeegee to give a defined layer having a thickness of 300 ☐m. The sample is then stored at room temperature for 12 hours to ensure full transformation into a precured precursor. Afterwards, the sample is covered by a second steel strip forming an overlap joint of 13 mm. The overlap joints are then clamped together using two binder clips and the test assemblies are further stored at room temperature for 4 hours after bonding, and then placed into an air circulating oven for 30 minutes at 180° C. The next day, the samples are either tested directly or undergo ageing and are tested thereafter. Five samples are measured for each of the examples and results averaged and reported in MPa.

2) T-Peel Strength According to DIN EN ISO 11339.

T-Peel strength is determined according to DIN EN ISO 11339 using a Zwick Z050 tensile tester (commercially available by Zwick GmbH & Co. KG, Ulm, Germany) operating at a cross head speed of 100 mm/min. For the preparation of a T-Peel Strength test assembly, the curable precursor paste is directly applied to the first surface via extruding a bead onto the middle of the T-peel test panel. The second test panel surface is then immediately bonded to the first forming an overlap joint of 100 mm, without waiting for the transformation into a precured precursor state, and the surfaces are pressed together to give a defined layer having a thickness of 300 ☐m. After removal of squeezed-out adhesive, the samples are fixed together with clamps and first stored at room temperature for 12 hours, and then placed into an air circulating oven for 30 minutes at 180° C. The next day, the samples are either tested directly or undergo ageing and are tested thereafter. Three samples are measured for each of the examples and results averaged and reported in Newtons (N).

3) Shear Storage Modulus (G').

The shear storage modulus is determined on a plate-plate rheometer (ARES, Rheometric Scientific) at a constant temperature (35° C.).

4) Shape Retention Factor.

The shape retention is determined according to the following procedure.

The curable compositions are shaped side-by-side into three-dimensional longitudinal beads having an equilateral triangle shape on a stainless-steel plate, using a customized squeegee provided with a suitable geometrically shaped recess. The steel plate is then placed at a 90° angle for 2 hours at 23° C. Afterwards, the steel plate is placed horizontally. The movement of the three-dimensional longitudinal bead is visually observed from a top view, and the shape retention factor is measured according to the following procedure.

The width of the base of the longitudinal bead is measured from a top view, wherein the base of the longitudinal bead is meant to refer to that portion of the bead which is direct contact with the stainless-steel plate. The middle of this width value is calculated and reported as value (A). This value corresponds to the distance between the lower extremity of the base of the longitudinal bead and the tip of the equilateral triangle which is opposed to the base, and which would be theoretically obtained for a three-dimensional longitudinal bead which remains unchanged through time (shape retention factor of 100%). In order to calculate the actual shape retention factor of the three-dimensional longitudinal beads, the actual distance between the lower extremity of the base of the longitudinal bead and the tip of the equilateral triangle which is opposed to the base, is measured and reported as value (B). This value is then compared to the theoretical value (A) according to the following formula:

$$\text{Shape retention factor } (\%) = (B/[A/2] \cdot 100)$$

Raw Materials:

In the examples, the following raw materials and commercial adhesive tapes used are used:

Bisaziridino polyether (BAPE) is a cationically self-polymerizable bisaziridino-functional oligomer having a number average molecular weight of about 6200 g/mol, which is obtained by copolymerization of ethylene oxide and tetrahydrofuran (in a ratio of about 1:4) as described in DE 1 544 837 (Schmitt et al.).

Methyl-p-toluenesulfonate (MPTS) is a polymerization initiator of the cationically self-polymerizable monomer, commercially available from Sigma-Aldrich.

Epikote 828 is an epoxy resin, commercially available from Hexion Specialty Chemicals GmbH, Iserlohn, Germany.

Eponex 1510 is a hydrogenated bisphenol epoxy resin, commercially available from Hexion Specialty Chemicals GmbH, Iserlohn, Germany.

Amicure CG1200 is a dicyandiamide-based latent curing initiator for epoxides, commercially from available from Evonik, Allentown, Pa., USA.

Dyhard UR500 is a curing accelerator for epoxides, commercially available from AlzChem Trostberg, Germany.

PK-HH is a phenoxy resin, commercially available from Gabriel Phenoxies Inc., Rock Hill, S.C., USA.

Paraloid EXL 2650J is a toughening agent, commercially available from The Dow Chemical Company, USA.

Micafort D150 is a silica based anti-corrosive agent, commercially available from LKAB Minerals GmbH, Essen, Germany.

Heucophos CMP is a calcium phosphate based anti-corrosive agent, commercially available from Heubach GmbH, Langelsheim, Germany.

MinSil SF20 is a fused silica filler, obtained from the 3M Company, USA.

EXAMPLES

Preparation of Examples 1 to 3

The exemplary curable compositions according to the present disclosure are prepared by combining the ingredients from the list of materials of Table 1 in a twin-screw extruder (ZSK18, available from Coperion, Germany) equipped with solid feeders (Minitwin solid feeders, available from Brabender GmbH, Germany) and a drum unloader (Model 201, available from SM Klebetechnik Vertriebs-GmbH Germany) according to the general procedure which follows:

PK-HH is dissolved in Epikote 828 and Eponex 1510 at 160° C. in a mixer until the mixture is homogenous and free of particles. Paraloid EXL is then added and dispersed with a dissolver plate into the previous mixture at 90° C. until a homogeneous mixture free of particles is obtained. Thereafter, Micafort D150, Heucophos CMP and MinSil SF20 are subsequently added and carefully mixed at 80° C. The residual air is removed under vacuum. The mixture is filled in a drum and pumped in the extruder using the drum unloader at 80° C. Then, MPTS is added and carefully mixed too. Amicure CG1200 and Dyhard UR500 are added at a melt temperature no greater than 90° C. BAPE is then incorporated immediately prior to the step of pressing the extrudable composition through the extrusion die. The extrudate is typically coated on a temporary substrate and cooled down.

TABLE 1

| Raw material | Weight % | | |
|---|---|---|---|
| | Ex.1 | Ex.2 | Ex.3 |
| BAPE | 4 | 4 | 3.1 |
| MPTS | 0.7 | 0.7 | 0.4 |
| Epikote 828 | 34.3 | 43.3 | 42.4 |
| Eponex 1510 | 6 | — | — |
| Amicure CG1200 | 2.8 | 2.8 | 2.8 |
| Dyhard UR500 | 1.2 | 1.2 | 1.3 |
| PK-HH | 12 | 4 | 5 |
| Paraloid EXL | 20 | 28 | 29 |
| Micafort D150 | 8 | 6 | 6 |
| Heucophos CMP | 4 | 4 | 2 |
| MinSil SF20 | 7 | 6 | 8 |

Shapeability Performance

All the exemplary curable compositions (Ex. 1 to Ex. 3) are stably shaped into three-dimensional longitudinal beads having the following shapes: triangle, semi-circular, rectangle, square, trapeze. The compositions are shaped through an extrusion die provided with a suitable geometry. Upon visual observation, it appeared that the shape of the exemplary curable compositions remained substantially unchanged upon partial curing (stage B reaction).

OLS and T-Peel Performance on Oily Contaminated Substrates

TABLE 2

Results of the OLS and T-Peel tests on oily contaminated substrates

| | Example 1 | Example 2 | Example 3 |
|---|---|---|---|
| OLS (MPa) | 23.1 | 19.6 | 21.3 |
| T-Peel (N) | 133 | 124 | 123 |

As can be seen from the results shown in Table 2, the structural adhesives according to the present disclosure provide excellent performance and characteristics as to overlap shear strength and T-Peel strength even on oily contaminated substrates.

The invention claimed is:

1. A process of manufacturing a curable precursor of a structural adhesive composition, comprising the steps of:
   providing an extruder comprising a reaction chamber and an extrusion die;
   providing a curable precursor of a structural adhesive composition, comprising:
      a cationically self-polymerizable monomer, wherein the cationically self-polymerizable monomer is a polyfunctional compound comprising at least one cyclic amine;
      a polymerization initiator of the cationically self-polymerizable monomer which is initiated at a temperature T1;
      a curable monomer which is different from the cationically self-polymerizable monomer, wherein the curable monomer which is different from the cationically self-polymerizable monomer comprises at least one functional group selected from the group consisting of epoxy groups; and
      a curing initiator of the curable monomer which is initiated at a temperature T2 and which is different from the polymerization initiator of the cationically self-polymerizable monomer;
   incorporating and mixing the curable precursor of the structural adhesive composition in the reaction chamber of the extruder, thereby forming an extrudable composition;
   pressing the extrudable composition of the preceding step through the extrusion die, thereby forming an extrudate of the curable precursor of the hybrid structural adhesive composition;
   optionally, cooling down the extrudate of preceding step; and
   allowing the self-polymerization reaction of the cationically self-polymerizable monomers in the extrudate; and
   wherein the polymerization initiator of the cationically self-polymerizable monomer or the cationically self-polymerizable monomer is incorporated and mixed in the curable precursor of the structural adhesive composition immediately prior to the step of pressing the extrudable composition through the extrusion die.

2. A process according to claim 1, wherein the temperature T2 is greater than T1, and wherein the temperature T1 at which the polymerization initiator of the cationically self-polymerizable monomer is initiated is insufficient to cause initiation of the curing initiator of the curable monomer.

3. A process according to claim 1, wherein the cationically self-polymerizable monomers remain substantially unpolymerized before the extrudable composition is pressed through the extrusion die.

4. A process according to claim 1, wherein the cationically self-polymerizable monomer is an oligomer having a number average molecular weight no greater than 20,000 g/mol.

5. A process according to claim 1, wherein the cationically self-polymerizable monomer is a polyfunctional compound comprising two cyclic amines.

6. A process according to claim 1, wherein the cationically self-polymerizable monomer is an aziridino-functional polyether oligomer.

7. A process according to claim 1, wherein the curable monomer which is different from the cationically self-polymerizable monomer comprises at least one functional group selected from the group consisting of glycidyl groups.

8. A process according to claim 1, wherein the polymerization initiator of the cationically self-polymerizable monomer is selected from the group consisting of protonating agents, alkylating agents, and any mixtures thereof.

9. A process according to claim 1, wherein the curing initiator of the curable monomer is selected from the group consisting of primary amines, secondary amines, and any mixtures thereof.

10. A process according to claim 1, wherein the extrudate comprises:
    a polymeric material comprising the self-polymerization reaction product of a polymerizable material comprising a cationically self-polymerizable monomer, wherein the cationically self-polymerizable monomer is a polyfunctional compound comprising at least one cyclic amine;

optionally, some residual polymerization initiator of the cationically self-polymerizable monomer which is initiated at a temperature T1;

a curable monomer which is different from the cationically self-polymerizable monomer, wherein the curable monomer which is different from the cationically self-polymerizable monomer comprises at least one functional group selected from the group consisting of epoxy groups;

a curing initiator of the curable monomer which is initiated at a temperature T2 and which is different from the polymerization initiator of the cationically self-polymerizable monomer; and wherein the curable monomers are substantially uncured and are embedded into the polymeric material comprising the self-polymerization reaction product of a polymerizable material comprising a cationically self-polymerizable monomer.

11. A process according to claim 1, which further comprises the step of shaping the extrudate in the form of a three-dimensional object.

12. A process according to claim 11, wherein the three-dimensional object has a shape selected from the group consisting of circular, semi-circular, ellipsoidal, square, rectangular, triangular, trapezoidal, polygonal shape, or any combinations thereof.

13. A method of bonding two parts, which comprises the steps of:

applying an extrudate as described in claim 1 to a surface of at least one of the two parts;

joining the two parts so that the extrudate is positioned between the two parts; and substantially fully curing the extrudate by initiating the curing initiator of the cationically curable monomer, thereby obtaining a structural adhesive composition having a degree of polymeriaztion of at least 95% and bonding the two parts.

14. A method of bonding two parts according to claim 13, wherein the two parts are metal or composite material parts, and wherein the method is for hem flange bonding of metal or composite material parts.

* * * * *